(12) United States Patent
Sangle-Ferriere

(10) Patent No.: US 12,105,672 B2
(45) Date of Patent: Oct. 1, 2024

(54) METHOD FOR IMPROVING THE HASHING OF A FILE

(71) Applicant: MARBEUF CONSEIL ET RECHERCHE, Paris (FR)

(72) Inventor: Bruno Sangle-Ferriere, Paris (FR)

(73) Assignee: Marbeuf Conseil et Recherche, Paris (FR)

( * ) Notice: Subject to any disclaimer, the term of this patent is extended or adjusted under 35 U.S.C. 154(b) by 0 days.

(21) Appl. No.: 18/374,791

(22) Filed: Sep. 29, 2023

(65) Prior Publication Data

US 2024/0111717 A1    Apr. 4, 2024

(30) Foreign Application Priority Data

Oct. 4, 2022   (FR) ....................... 2210136

(51) Int. Cl.
*G06F 16/00* (2019.01)
*G06F 9/30* (2018.01)
(Continued)

(52) U.S. Cl.
CPC ........ *G06F 16/137* (2019.01); *G06F 9/30029* (2013.01); *H04L 9/0643* (2013.01)

(58) Field of Classification Search
CPC ............................... G06F 16/00; G06F 16/137
See application file for complete search history.

(56) References Cited

U.S. PATENT DOCUMENTS

| 6,104,811 A | 8/2000 | Aiello et al. | |
| 8,533,483 B2 * | 9/2013 | Izu | G06F 21/64 713/180 |

(Continued)

FOREIGN PATENT DOCUMENTS

| CN | 101547184 A | 9/2009 |
| EP | 1421548 A1 | 5/2004 |

(Continued)

OTHER PUBLICATIONS

A Search Report issued by the The National Industrial Property Institute of France dated May 4, 2023 in connection with French Patent Application No. 2210136.

(Continued)

*Primary Examiner* — Cheryl Lewis
(74) *Attorney, Agent, or Firm* — Baker & McKenzie LLP

(57) ABSTRACT

Method for calculating a modifier code of a file, the method comprising the following steps:
  a) establishing a list of possible modifier codes;
  b) establishing a list of a plurality of possible mixer numbers;
  c) for each modifier code: i) creating a list of hashes of the file;
    ii) for each mixer number, calculating the hash of the file mixed and modified by the modifier code, the modification of the file being performed using the same modification function;
    iii) adding each hash calculated in step ii) to the list of hashes of the file;
    iv) counting the number of different elements N of the list of hashes;
    v) memorizing this number N, as well as the associated modifier code, if N is the first to be counted or is greater than the number N previously memorized; and
  d) returning the last modifier code memorized.

13 Claims, 4 Drawing Sheets

(51) Int. Cl.
 *G06F 16/13* (2019.01)
 *H04L 9/06* (2006.01)

(56) References Cited

U.S. PATENT DOCUMENTS

| | | |
|---|---|---|
| 9,565,022 B1 | 2/2017 | Robshaw et al. |
| 10,193,695 B1 | 1/2019 | Endress et al. |
| 10,362,169 B1 | 7/2019 | Sanderlin |
| 10,891,366 B1 | 1/2021 | Wu et al. |
| 11,914,754 B2 | 2/2024 | Sangle-Ferriere |
| 2011/0072278 A1* | 3/2011 | Izu .................. G06F 21/64 713/193 |
| 2011/0116096 A1 | 5/2011 | Welch |
| 2011/0246433 A1 | 10/2011 | Sun |
| 2012/0057702 A1 | 3/2012 | Minematsu |
| 2012/0143765 A1 | 6/2012 | Yamaguchi et al. |
| 2014/0089273 A1* | 3/2014 | Borshack ............ G06F 16/137 707/821 |
| 2014/0298038 A1 | 10/2014 | Gauravaram |
| 2014/0351593 A1 | 11/2014 | Anson |
| 2014/0364098 A1 | 12/2014 | Ueno |
| 2015/0261502 A1 | 9/2015 | Sartor et al. |
| 2018/0068127 A1 | 3/2018 | Hamano et al. |
| 2018/0176011 A1 | 6/2018 | Hars |
| 2018/0248686 A1 | 8/2018 | Alakuijala et al. |
| 2018/0248687 A1 | 8/2018 | Wassenberg et al. |
| 2018/0253439 A1* | 9/2018 | Ramirez .............. G06F 21/564 |
| 2018/0324152 A1 | 11/2018 | Jarchafjian et al. |
| 2018/0367540 A1 | 12/2018 | Miranda |
| 2019/0080189 A1 | 3/2019 | Van Os et al. |
| 2019/0102782 A1 | 4/2019 | Diehl |
| 2019/0104121 A1 | 4/2019 | Khandani |
| 2019/0109715 A1 | 4/2019 | Hars |
| 2020/0034050 A1 | 1/2020 | Brasfield et al. |
| 2020/0068244 A1 | 2/2020 | Hunacek et al. |
| 2020/0110905 A1 | 4/2020 | O'Cleirigh |
| 2020/0226952 A1 | 7/2020 | Lightowler |
| 2020/0236092 A1 | 7/2020 | Von Vistauxx |
| 2020/0351100 A1 | 11/2020 | Sangle-Ferriere |
| 2021/0157915 A1* | 5/2021 | Pizano .................. G06F 21/563 |
| 2021/0165914 A1 | 6/2021 | Sangle-Ferriere |
| 2021/0165915 A1* | 6/2021 | Goodwin ................ G06F 21/64 |
| 2021/0382817 A1 | 12/2021 | Tajima et al. |
| 2022/0085984 A1 | 3/2022 | Khandani |
| 2022/0166627 A1 | 5/2022 | Pakhomchik et al. |
| 2023/0094612 A1 | 3/2023 | Chen et al. |
| 2023/0217210 A1 | 7/2023 | Russell et al. |

FOREIGN PATENT DOCUMENTS

| | | |
|---|---|---|
| FR | 3092923 A1 | 8/2020 |
| WO | 03/007228 A1 | 1/2003 |

OTHER PUBLICATIONS

A Search Report issued by the The National Industrial Property Institute of France dated May 2, 2023 in connection with French Patent Application No. 2210136.
A Preliminary Report issued by the The National Industrial Property Institute of France dated Nov. 14, 2019 in connection with French Patent Application No. 1901648.
Hsieh, Tsu-Miin et al., "One-way hash functions with changeable parameters" Information Sciences, Sep. 1999, vol. 118, Issues 1-4, pp. 223-239.
Foreign Examination Report dated Mar. 8, 2023 in connection with Indian Patent Application No. 202127035375, 7 pages.
International Search Report and Written Opinion dated Apr. 21, 2020 in connection with International Application No. PCT/EP2020/054126, 10 pages.
Preliminary Search Report for FR 1901648 mailed Nov. 14, 2019 (2 pages).

* cited by examiner

Table Lv

| M | V | N |
|---|---|---|
| M1 | V1 | n1 |
| M1 | V2 | n2 |
| M1 | V3 | n3 |
| M2 | V1 | n4 |
| M2 | V2 | n5 |
| M2 | V3 | n6 | n2>n4

METHOD FOR IMPROVING THE HASHING OF A FILE

CROSS REFERENCE TO RELATED APPLICATION

The present application claims priority to French Patent Application No. 2210136, filed on Oct. 4, 2022, the entire contents of which is incorporated herein by reference.

TECHNICAL FIELD

The present invention relates to the field of security of computing and electronic devices, in particular hashing.

PRIOR ART

"Hash" is the term used to denote the result of a hashing function which, from an initial datum supplied as input, calculates a print that serves to rapidly, although incompletely, identify the initial datum.

The quality of a file F hashing function is often judged by the difficulty, in terms of computation time, in calculating a file that is similar to the file F but has an identical hash. This quality depends on the complexity of the hashing function, but also on the size of the calculated hash, and on the existence of any mathematical rules making it possible to reduce the number of calculations to be performed to calculate one of the possible similar files.

The patent FR3092923 discloses a cryptographic method for verifying data in which a datum is mixed with a mixer number, preferentially a random number, before being hashed. Thus, in this case, the quality of the hashing function of a given file depends on the cardinal of all of the different mixer numbers of given size that can be mixed with said file prior to the hashing thereof by said hashing function and that give different hashes. The quality of the hashing function is then proportional to this cardinal, because the greater the latter is, the more chances there are of calculating different hashes with different mixer numbers.

SUMMARY OF THE INVENTION

There is therefore a need to improve the hashing quality, notably in terms of robustness, to reduce the possibility of creating the same hash from different but similar data.

The invention aims to address this objective, and its subject, according to one of its aspects, is a method for calculating a modifier code of a file or of a datum, referred to indiscriminately as file hereinbelow, the method being implemented by at least one device, in order notably to increase the number of possible hashes of the file mixed with different mixer numbers, the file being mixed using the same mixing function, the hashes being obtained using the same hashing function, the method comprising the following steps:
a) establishing a list of a plurality of possible modifier codes given the number of bits on which these codes are generated;
b) establishing a list of a plurality of possible mixer numbers given the number of bits on which these numbers are generated;
c) for each modifier code:
  i) creating a list of hashes of the file, preferably empty;
  ii) for each mixer number, calculating the hash of the file modified by the modifier code then mixed with the mixer number, the modification of the file being performed using the same modification function;
  iii) adding each hash calculated in step ii) to the list of hashes of the file;
  iv) counting the number of different elements N of the list of hashes;
  v) memorizing this number N, as well as the associated modifier code, if N is the first to be counted or is greater than the number N previously memorized; and
d) returning the last modifier code memorized.

A step vi) can be introduced in which the number N as well as the associated modifier are memorized if N is equal to the number N previously memorized.

The device can be a personal computer, a smart phone, an electronic mail server, or a computing server, etc.

The modification function, applied to the file, makes use of the modifier code, to alter the file. The duly altered file is then transmitted, in clear or encrypted, and accompanied with its electronic signature, preferably as defined in the patent FR3092923.

The invention makes it possible to increase the number of different hashes of the file transmitted and mixed with one of the possible mixer numbers, and thus reduce the probability of being able to guess the hash of the file transmitted and mixed with a mixer number.

Advantageously, the calculation method according to the invention is implemented by a quantum computer.

In a preferred embodiment, said plurality of modifier codes corresponds to at least 90% of all the possible modifier codes given the number of bits on which these codes are generated. The plurality of modifier codes can correspond to all of the possible modifier codes given the number of bits on which these codes are generated.

In a preferred embodiment, said plurality of mixer numbers corresponds to at least 90% of all the possible mixer numbers given the number of bits on which these numbers are generated.

The plurality of the mixer numbers can correspond to all of the possible mixer numbers given the number of bits on which these numbers are generated.

Preferably, the calculation of the hashes in step ii) is performed simultaneously, using a quantum computer, for said plurality of mixer numbers.

Preferably, step c) is performed using a quantum computer, simultaneously for said plurality of modifier codes.

The mixing function, respectively the modification function, can be chosen from among:
  a logic function of XOR type adding all or certain bits of the file and those of the mixer number, respectively of the modifier code, one by one,
  a suffix function adding the mixer number, respectively the modifier code, at the end of the file,
  a prefix function adding the mixer number, respectively the modifier code, at the start of the file,
  a function adding the mixer number, respectively the modifier code, to the file at a predefined position,
  an encryption function using the mixer number, respectively the modifier code, as file encryption key.

Preferably, the modification function is chosen from among:
  a suffix function adding the modifier code at the end of the file,
  a prefix function adding the modifier code at the start of the file,
  a function adding the modifier code to the file at a predefined position, an encryption function using the modifier code as file encryption key, the modifier code being for example added as suffix or as prefix to the encrypted file.

The mixing function is, for example, and in a nonlimiting manner, a suffix function adding the mixer number at the end of the file, a prefix function adding the mixer number at the start of the file, a function adding the mixer number to the file at a predefined position, a symmetrical or asymmetrical encryption function using the mixer number as file encryption key, or a logic function of XOR type adding all or certain bits of the file and those of the mixer number one by one.

In one embodiment, the mixing function is different from the modification function.

In another embodiment, the mixing function is identical to the modification function.

The hashing function is preferentially chosen from among SHA1, SHA2, SHA256, MD5 and the Jenkins function, or even truncations of the results of these functions.

The modifier code can serve as parameter to the hashing function, notably by modifying the internal mechanisms thereof or by being one of the internal parameters.

The modifier code is then for example added at the start of the file and serves as parameter to the hashing function as key for a key hashing function, as for example described in the article "One-way hash functions with changeable parameters" published in 1999 in issue 188 of the journal "Information Sciences".

The modifier code can also be or form part of the file to be modified, notably when this file is a multimedia datum such as an image. For example, in this case, the modifier code can modify certain attributes of certain elements of the image such as a colour, a tone, a spacing, etc., or the attributes of a sound for an audio file.

The mixer number and the modifier code can have the same size.

Alternatively, the mixer number and the modifier code are of different sizes.

If the modifier code is on n bits, the list established in step a) can comprise up to 2n modifier codes.

Similarly, if the mixer number is on m bits, the list established in step b) can comprise up to $2^m$ mixer numbers.

Also a subject of the invention, according to a second of its aspects, is a method for calculating a modifier code of a file comprising variable information not yet determined, for example such as the name and the address of the holder of a member card, the file forming a file that is filled in once the variable information is set, the method being implemented by at least one device, in order notably to increase the smallest possible number of hashes of the filled-in files mixed with different mixer numbers, the filled-in files being mixed using the same mixing function, the hashes being obtained using the same hashing function, the method comprising the following steps:
  a) establishing a list of a plurality of possible modifier codes given the number of bits on which these codes are generated;
  b) establishing a list of a plurality of possible mixer numbers given the number of bits on which these numbers are generated;
  c) establishing a list of a plurality of variable information;
  d) creating an empty list Lv that can contain integer numbers associated with modifier codes and variable information;
  e) for each modifier code and for each variable information item:
    i) creating a list of hashes of the file, preferably empty, that can receive hashes of the file;
    ii) for each mixer number, calculating the hash of the file modified by the modifier code then mixed with the mixer number, the modification of the file being performed using the same modification function;
    iii) adding each hash calculated in step ii) to the list of hashes of the file;
    iv) counting the number of different elements N of the list of hashes;
    v) memorizing this number N, as well as the modifier code and the variable information item which are associated with it, by adding it to the list Lv;
  f) establishing, from the list Lv, a table T giving, for each modifier code, a number PPN which is the smallest of the numbers N out of all the numbers N of the table Lv associated with the same modifier code; and
  g) extracting from the table T the modifier code or codes corresponding to the greatest of the numbers PPN of the table T.

The variable information can comprise text, dates, a photo, etc.

The file can also comprise set information, e.g. a format, a security code, etc.

This variant of the method according to the invention makes it possible to optimize the file which has variable information, because not only is the modifier code varied, but so is this variable information, to find a modifier code to be added to the file, to be able to give the greatest number of different hashes when the mixer number inserted into the filled-in file changes, regardless of the variable information entered in the file.

In one embodiment of the method according to the second aspect, step e) is performed simultaneously for said plurality of modifier codes and/or for all the variable information, using a quantum computer.

All the features defined above for the first aspect of the method according to the invention apply to the second aspect of the method that is the subject of the invention.

Another subject of the invention, according to another of its aspects, is a computer program product comprising instructions that can be read by the processor of a device for the implementation of the method according to the invention, in its first or second aspect.

BRIEF DESCRIPTION OF THE DRAWINGS

The invention can be better understood on reading the following detailed description, of non-limiting examples of implementation thereof, and on studying the attached drawings, in which.

DETAILED DESCRIPTION

Figure 1:
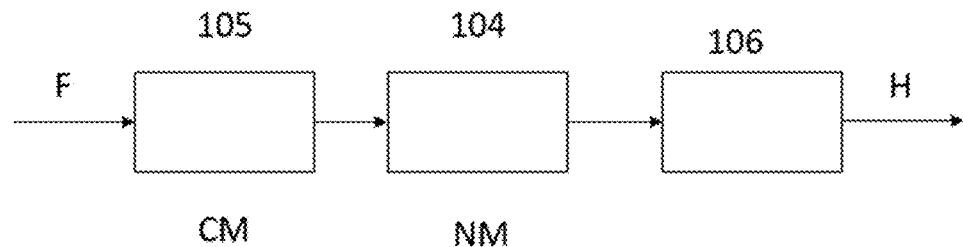
FIG. 1 FIG. 1 schematically represents an example of file hashing according to the invention.

FIG. 1 schematically illustrates the steps of obtaining a hash H of a file F. In this example, the file F is modified by a modifier code CM using a modification function 105 then mixed with a mixer number NM with a mixing function 104. The mixing and modification functions can be identical or different. For example, it can involve a suffix function adding the modifier code CM or the mixer number NM at the end of the file F. The mixer number and the modifier code can have the same size, for example 56 bits, or be of different sizes. Finally, the modified then mixed file is hashed using a hashing function 106 to give the hash H.

One objective of the invention is to increase the number of possible hashes H of the file F mixed with different mixer numbers NM, the file being mixed using the same mixing function 104, the hashes H being obtained using the same hashing function 106.

Figure 2:
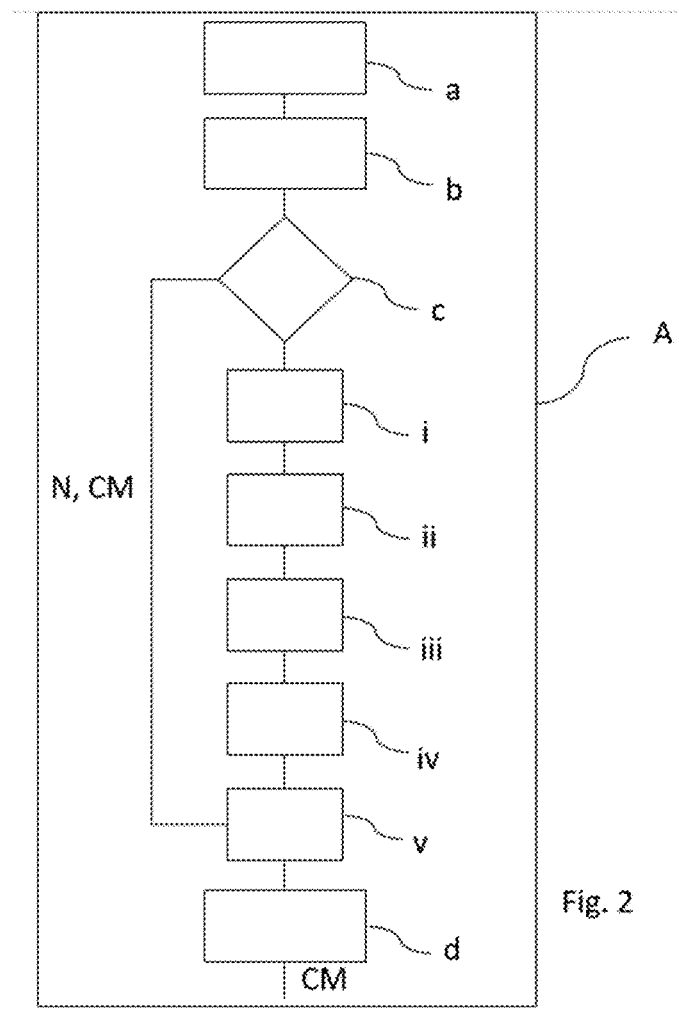
FIG. 2 FIG. 2 schematically illustrates an example of implementation of the invention.

FIG. 2 is a block diagram illustrating the different steps of an example of a method according to the invention implemented on a device A.

In step a), an exhaustive list of the modifier codes CM of given size is established. If the modifier code CM is on n bits, this list comprises $2^n$ modifier codes.

In step b), an exhaustive list of the mixer numbers NM of given size is established. If the mixer number NM is on m bits, this list comprises $2^m$ mixer numbers.

In step c), for each modifier code CM of the list established in step a), steps i) to v) are implemented. First of all, an empty list of hashes is created in step i). Next, in step ii), for each mixer number NM of the list established in step b), the hash H of the file F modified by the modifier code CM then mixed with the mixer number NM is calculated, the modification being performed by the same modification function 105. In step iii), each hash H calculated in the preceding step is added to the list of hashes H of the file F if the latter does not already contain it. In step iv), the number of elements N of the list of hashes is counted. In step v), this number N and the associated modifier code CM are retained, if N is the first to be counted or is greater than the number N previously retained.

In step d), the last modifier code CM retained is returned, as corresponding to the most robust hashing operation.

As an example, if a modifier code on 2 bits is considered, the set of modifier codes contains 4 consecutive elements of the list established in step a)={CM1, CM2, CM3, CM4}. Assume that, for CM1, 3 different hashes are obtained (after mixing and modification), i.e. N=3. It is this number N which is retained initially in step v) since it is the first to have been calculated, with the associated modifier code CM1. Next, assume that, for CM2, 4 different hashes are obtained, i.e. N=4. For this iteration, in step v), it is N=4 which will be retained with CM2 as associated modifier code. Then, assume that, for CM3, 2 different hashes are obtained, i.e. N=2, which will not be retained, because it is less than the preceding one. Finally, assume that, for CM4, 1 different hashes are obtained, i.e. N=1.

It is this number N, with CM2, which will be retained. At the end, in step d), CM2 is returned as being the modifier code corresponding to the most robust hashing operation.

Figure 3:
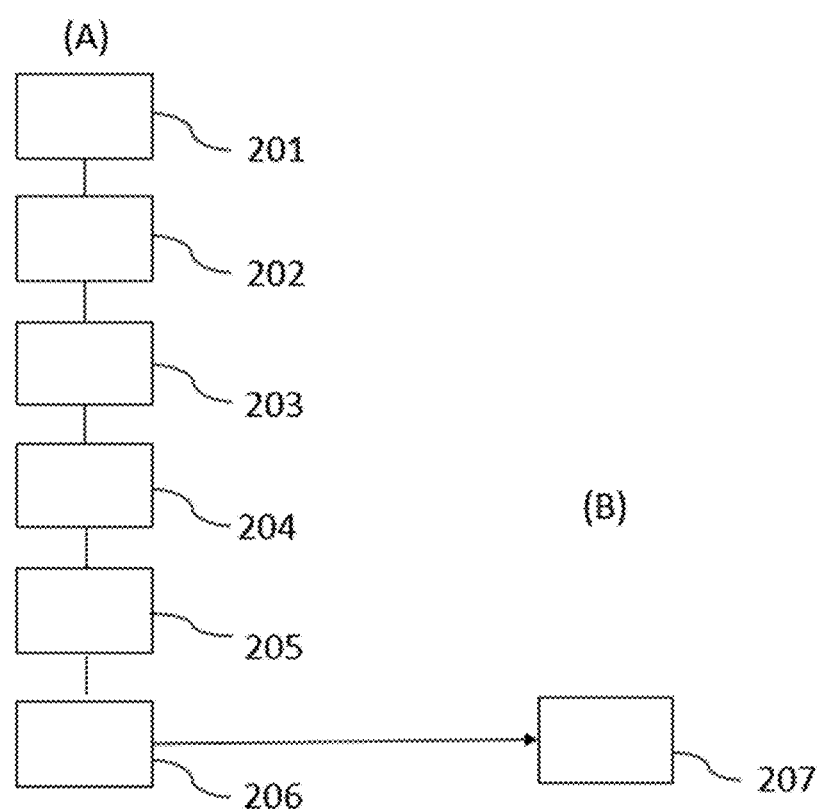
FIG. 3 FIG. 3 schematically represents an example of implementation of a method for verifying the integrity of a file modified according to the invention.

FIG. 3 schematically represents an example of implementation of a method for verifying the integrity of a file modified according to the invention:

Step 201: the message is received by the device A
Step 202: the modifier code is calculated
Step 203: the mixer number, a secret shared with the recipient B of the message, is extracted from the memory
Step 204: the file is modified with the modifier code and mixed with the mixer number Step 205: the hash of the file modified in step 204 using the modifier code and mixed using the mixer number is encrypted by a one-time key Step 206: the file obtained in step 204 is sent, in clear with the encrypted hash obtained in step 205, to the recipient B Step 207: the recipient B receives the file and verifies that the hash of the file mixed with the mixer number then encrypted by the one-time key used in step 205 is equal to the encrypted hash transmitted with said received file.

Figure 4:
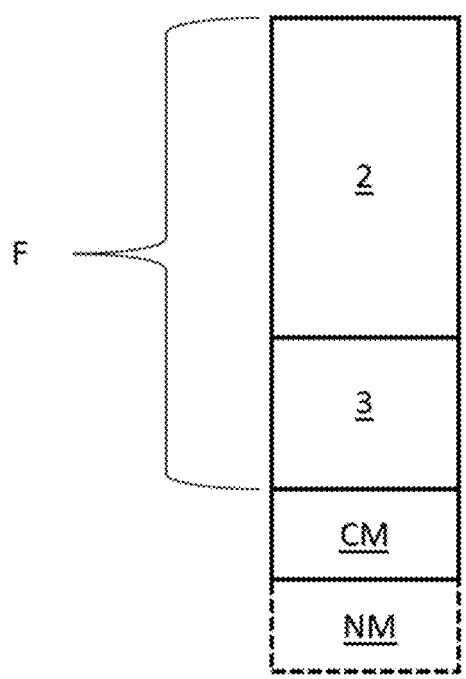
FIG. 4 FIG. 4 schematically illustrates an example of a file intended to be used in a variant of the method according to the invention.

The method according to the invention can be applied to a file F, as illustrated in FIG. 4, comprising variable information 3 such as a card number, a biometric print or a photo and set information 2 such as a format. A variant of the method then consists in varying not only the modifier code CM, but also the variable information 3.

Indeed, step e) described above is performed for each modifier code CM and for each variable information item 3. The sub steps i) to iv) remain unchanged. In step v), the number N is memorized, as are the modifier code CM and the variable information item 3 which are associated with it, in a list Lv.

In step f), from the list Lv, a table T is established containing, for each modifier code CM, a number PPN which is the smallest number N according to the variable information 3.

In step g), the modifier code or codes CM that correspond to the greatest of the numbers PPN is or are deduced from the table T.

Figure 5:
FIG. 5 FIG. 5 schematically represents an example of a table Lv used in said variant of the method according to the invention.

FIG. 5 schematically represents an example of a table Lv used in said variant of the method according to the invention.

Take the simple example of a set comprising only two modifier codes CM: {M1, M2}. The variable information 3 is denoted V in the table Lv of FIG. 5 and comprises only 3 elements: {V1, V2, V3}. A total of 6 numbers N of hashes is obtained: {n1, n2, n3, n4, n5, n6}.

In this example of a table Lv, for each given modifier code CM, a number PPN is highlighted in bold and underlined, this being the smallest number N according to the variable information. In this case, for CM=M1, PPN=n2, and for CM=M2, PPN=n4.

If n2>n4, it is n2 which is retained in the final step g) and it corresponds to the modifier code M1.

The invention is not limited to the exemplary embodiments described above. The calculation of the modifier code can be used in the context of the patent FR3092923, by adding the modifier code to a datum for which an electronic signature has to be determined, and thus reduce the probability of allowing the undetected transmission of a different datum. The invention can be used notably to secure financial transactions.

The invention claimed is:

1. Method for calculating a modifier code of a file, implemented by at least one device, the file being mixed using a same mixing function, hashes being obtained using a same hashing function, the method comprising the following steps:
a) establishing a list of a plurality of possible modifier codes given the number of bits on which the plurality of possible modifier codes are generated;
b) establishing a list of a plurality of possible mixer numbers given the number of bits on which the plurality of possible mixer numbers are generated;
c) for each of the plurality of possible modifier codes:
i) creating a list of hashes of the file;

ii) for each the plurality of possible mixer numbers, calculating a hash of the file modified by the modifier code then mixed with the mixer number, the modification of the file being performed using a same modification function;

iii) adding each hash calculated in step ii) to the list of hashes of the file;

iv) counting a number of different elements N of the list of hashes of the file;

v) memorizing the number N, as well as the modifier code associated with the number N, if the number N is the first to be counted or is greater than the number N previously memorized; and d) returning the modifier code last memorized.

2. Method according to claim 1, said plurality of possible modifier codes corresponding to at least 90% of all possible modifier codes given the number of bits on which the plurality of possible modifier codes are generated.

3. Method according to claim 1, said plurality of possible mixer numbers corresponding to at least 90% of all possible mixer numbers given the number of bits on which the plurality of possible mixer numbers are generated.

4. Method according to claim 1, the calculation of the hash in step ii) being performed simultaneously for said plurality of possible mixer numbers.

5. Method according to claim 1, step c) being performed simultaneously for said plurality of possible modifier codes.

6. Method according to claim 1, the same mixing function, respectively the same modification function, being chosen from among:
- a logic function of XOR type adding all or certain bits of the file and those of the mixer number, respectively of the modifier code, one by one,
- a suffix function adding the mixer number, respectively the modifier code, at the end of the file,
- a prefix function adding the mixer number, respectively the modifier code, at the start of the file,
- a function adding the mixer number, respectively the modifier code, to the file at a predefined position,
- an encryption function using the mixer number, respectively the modifier code, as a file encryption key.

7. Method according to claim 1, the same mixing function being different from the same modification function.

8. Method according to claim 1, the same mixing function being identical to the same modification function.

9. Method according to claim 1, the same hashing function being chosen from among SHA1, SHA2, SHA256, MD5 and the Jenkins function.

10. Method according to claim 1, the mixer number and the modifier code being of same size.

11. Method according to claim 1, the mixer number and the modifier code being of different sizes.

12. Computer program product comprising instructions that can be read by a processor of a device for implementing the method according to claim 1.

13. Method according to claim 1, further comprising calculating a modifier code of a file comprising variable information not yet determined, the file comprising a file filled in once the variable information is set;

wherein, b) establishing a list of a plurality of possible mixer numbers is followed by the following steps:

c) establishing a list of a plurality of variable information;

d) creating a list Lv that can contain integer numbers associated with modifier codes and the variable information, wherein the list Lv is initially empty;

e) for each modifier code and for each variable information item:
  i) creating a list of hashes of the file, preferably empty, that can receive hashes of the file;
  ii) for each mixer number, calculating a hash of the file modified by the modifier code then mixed with the mixer number, the modification of the file being performed using a same modification function;
  iii) adding each hash calculated in step ii) to the list of hashes of the file;
  iv) counting a number of different elements N of the list of hashes of this file;
  v) memorizing the number N, as well as the modifier code associated with the number N, if the number N is the first to be counted or is greater than the number N previously memorized;

and the variable information item which are associated with it, by adding it to the list Lv;

f) establishing, from the list Lv, a table T containing, for each modifier code, a number PPN which is the smallest of the numbers N out of all the numbers N of the list Lv associated with the modifier code; and g) extracting from the table T the modifier code or codes corresponding to the greatest of the numbers PPN of the table T.

* * * * *